(12) United States Patent
Brotto et al.

(10) Patent No.: US 7,346,406 B2
(45) Date of Patent: Mar. 18, 2008

(54) SYSTEM AND METHOD FOR DATA RETRIEVAL IN AC POWER TOOLS VIA AN AC LINE CORD

(75) Inventors: Daniele C. Brotto, Baltimore, MD (US); Brian R Crowell, York, PA (US)

(73) Assignee: Black & Decker Inc., Newark, DE (US)

( * ) Notice: Subject to any disclaimer, the term of this patent is extended or adjusted under 35 U.S.C. 154(b) by 124 days.

(21) Appl. No.: 11/350,359

(22) Filed: Feb. 8, 2006

(65) Prior Publication Data

US 2006/0195202 A1 Aug. 31, 2006

Related U.S. Application Data

(63) Continuation of application No. 10/620,586, filed on Jul. 16, 2003, now Pat. No. 7,054,696.

(60) Provisional application No. 60/396,975, filed on Jul. 18, 2002.

(51) Int. Cl.
*G06F 19/00* (2006.01)

(52) U.S. Cl. .................. 700/83; 700/17; 700/108; 700/180; 173/1; 173/4; 702/183

(58) Field of Classification Search .................. 700/17, 700/32, 35, 83, 108, 174, 175, 180; 173/1, 173/4, 11, 20, 173; 702/33, 34, 35, 182, 702/183, 184; 340/854.3
See application file for complete search history.

(56) References Cited

U.S. PATENT DOCUMENTS 4,162,527 A 7/1979 Kilbane et al.
4,194,178 A 3/1980 Dumbeck
4,263,647 A 4/1981 Merrell et al.
4,351,029 A 9/1982 Maxey et al.
4,410,846 A 10/1983 Gerber et al.
4,418,333 A 11/1983 Schwarzbach et al.

(Continued)

FOREIGN PATENT DOCUMENTS

DE 33 12 600 A1 10/1984

(Continued)

*Primary Examiner*—Kidest Bahta
*Assistant Examiner*—Douglas S Lee
(74) *Attorney, Agent, or Firm*—Harness, Dickey & Pierce, P.L.C.

(57) ABSTRACT

An apparatus and method for obtaining data stored in an electronic module within a power tool over a power line cord of the tool, and without any disassembly of the tool being required. An interface subsystem applies a high frequency, low power AC input signal to the power cord of the tool. A controller within the tool recognizes this signal as an indication that the tool is to be placed in a communications mode. The controller modulates a power switching device used for turning on and off the motor of the tool in such a fashion that current pulses are transmitted over the power line cord back to the interface subsystem. The current pulses correspond to tool usage/performance/identification information stored in the electronic module of the tool. This information is interpreted by a current reader circuit of the interface subsystem as binary information which is then transmitted to an external computing device for analysis and/or recording.

29 Claims, 4 Drawing Sheets

U.S. PATENT DOCUMENTS

| | | |
|---|---|---|
| 4,513,381 A | 4/1985 | Houser, Jr. et al. |
| 4,628,459 A | 12/1986 | Shinohara et al. |
| 4,636,961 A * | 1/1987 | Bauer .................... 700/168 |
| 4,665,399 A | 5/1987 | Fauser et al. |
| 4,714,912 A | 12/1987 | Roberts et al. |
| 4,809,200 A | 2/1989 | Moore et al. |
| 4,854,786 A | 8/1989 | Alexander et al. |
| 4,910,753 A | 3/1990 | Wakatsuki et al. |
| 5,051,720 A | 9/1991 | Kittirutsunetorn |
| 5,323,325 A | 6/1994 | Izumiya |
| 5,416,399 A | 5/1995 | Brunson |
| 5,504,864 A | 4/1996 | Berg |
| 5,568,033 A | 10/1996 | Brunson |
| 5,581,229 A | 12/1996 | Hunt |
| 5,587,931 A | 12/1996 | Jones et al. |
| 5,710,712 A | 1/1998 | Labun |
| 5,787,018 A * | 7/1998 | Bolan et al. .................. 702/33 |
| 5,875,420 A | 2/1999 | Piety et al. |
| 5,903,462 A | 5/1999 | Wagner et al. |
| 5,981,905 A | 11/1999 | Ohmi et al. |
| 6,005,489 A | 12/1999 | Siegle et al. |
| 6,021,360 A | 2/2000 | Barker et al. |
| 6,202,002 B1 | 3/2001 | Fainstein et al. |
| 6,218,806 B1 | 4/2001 | Brotto et al. |
| 6,260,427 B1 | 7/2001 | Jones et al. |
| 6,308,138 B1 | 10/2001 | Jones et al. |
| 6,326,884 B1 | 12/2001 | Wohlrabe |
| 6,343,649 B1 | 2/2002 | Beck et al. |
| 6,359,569 B2 | 3/2002 | Beck et al. |
| 6,369,472 B1 | 4/2002 | Grimm et al. |
| 6,390,205 B2 * | 5/2002 | Wallgren et al. ............... 173/2 |
| 6,570,493 B1 | 5/2003 | Rotem |
| 6,607,041 B2 | 8/2003 | Suzuki et al. |
| 7,091,676 B2 * | 8/2006 | Rodriguez et al. .......... 315/307 |
| 2001/0010455 A1 | 8/2001 | Brotto et al. |
| 2002/0144832 A1 | 10/2002 | Brandstrom et al. |
| 2005/0011655 A1 | 1/2005 | Crowell et al. |
| 2005/0258765 A1* | 11/2005 | Rodriguez et al. ............ 315/86 |

FOREIGN PATENT DOCUMENTS

| | | |
|---|---|---|
| DE | 34 17 455 A1 | 11/1985 |
| DE | 37 44 733 C2 | 8/1989 |
| DE | 41 19 094 A1 | 1/1993 |
| DE | 42 04 237 A1 | 8/1993 |
| DE | 43 12 161 A1 | 10/1994 |
| DE | 44 02 236 C2 | 9/1996 |
| DE | 195 37 280 A1 | 4/1997 |
| DE | 196 12 089 A1 | 10/1997 |
| DE | 196 06 719 C2 | 12/1997 |
| DE | 197 13 686 A1 | 10/1998 |
| DE | 198 24 169 A1 | 12/1999 |
| DE | 100 24 221 C1 | 7/2001 |
| DE | 100 13 023 A1 | 9/2001 |
| DE | 100 14 183 A1 | 10/2001 |
| DE | 200 07 904 U1 | 10/2001 |
| DE | 100 29 133 A1 | 1/2002 |
| DE | 100 29 138 A1 | 1/2002 |
| EP | 0 119 928 A1 | 9/1984 |
| EP | 0 148 458 A2 | 7/1985 |
| EP | 0 148 458 B1 | 9/1992 |
| EP | 1 043 107 A2 | 10/2000 |
| FR | 2 599 877 | 12/1987 |
| GB | 2 352 376 | 1/2001 |
| JP | 02246656 | 4/1992 |
| JP | 07-240705 | 9/1995 |
| JP | 08141927 A | 6/1996 |
| JP | 10305366 A | 11/1998 |
| JP | 11129164 A | 5/1999 |
| WO | WO 96/06479 | 2/1996 |

* cited by examiner

SYSTEM AND METHOD FOR DATA RETRIEVAL IN AC POWER TOOLS VIA AN AC LINE CORD

CROSS-REFERENCE TO RELATED APPLICATIONS

This application is a continuation of U.S. patent application Ser. No. 10/620,586 filed on Jul. 16, 2003 now U.S. Pat. No. 7,054,696 and claims the benefit of U.S. Provisional Application No. 60/396,975, filed on Jul. 18, 2002. The disclosures of the above applications are incorporated herein by reference.

FIELD OF THE INVENTION

This invention relates to electrically driven power tools and more particularly to an apparatus and method for communicating information over a power line cord of a power tool between an electronic module disposed within the tool and an external data logging device, to thus obtain data concerning the power tool without physically disassembling the power tool.

BACKGROUND OF THE INVENTION

With present day power tools, it would be highly desirable to provide some means for obtaining usage and other pertinent information concerning the operation of the tool without the need for disassembling a housing of the tool or otherwise mechanically accessing interior portions of the tool. Present day electronic components, such as controller/memory modules, are sufficiently small such that they can be easily housed within the housings of various types of power tools such as drills, saws, sanders, etc. A system and/or method which allows an external device to communicate over a power cord of the power tool with an electronic module mounted within a housing of the tool to obtain usage and/or operating information concerning the power tool would be highly advantageous. Such a system would eliminate the need for a service technician to disassemble the tool to gain access to the electronic module. It would allow manufacturers to quickly and easily obtain highly pertinent operating and usage information recorded by the electronic module. It would further eliminate the need to include an intercare port somewhere on the housing, which is something that is not easily accomplished on small, hand held power tools such as drills, hand held sanders, etc.

SUMMARY OF THE INVENTION

The present invention is directed to an apparatus and method for using an external device to communicate over a power cord of a power tool with an electronic module mounted within a housing of the power tool. In one preferred form the electronic module is adapted to communicate with a controller disposed inside the power tool which recognizes signals communicated over the power line of the tool that indicate that the power tool is to be placed in a communication mode.

The apparatus of the present invention includes an external interface subsystem which is coupled to a computing device, such as a personal computer or laptop computer, and also to the power cord of the power tool. The interface subsystem is further coupled to an AC power source. The interface subsystem generates an AC signal that has a different frequency and/or magnitude than a standard AC mains signal, which is applied to the power cord of the tool. The controller recognizes this signal as an indication that the power tool is to be placed in a communication mode. The power tool communicates information from its control module by modulating a switching device used to switch on and off the motor of the power tool. Modulating the switching device causes current pulses to be produced on the power cord that are sensed by a current reading circuit of the interface subsystem. The controller within the power tool is also synchronized to the frequency of the signal applied by the interface subsystem to the power cord of the tool. The controller modulates the switching device to produce a series of current pulses over the power cord that are synchronized with the input signal applied to the power cord. These current pulses form coded information, in one preferred form binary information, indicative of various types of usage or operational information recorded by the control module. These current pulses are sensed by the current reader circuit of the interface subsystem. The interface subsystem extrapolates this usage/operational information from the coded information and transmits the usage/operational information to an external data logging device. In one implementation the external data logging device may comprise a computing device such as a personal computer, a laptop computer or some other computing apparatus.

In an alternative preferred embodiment, the interface subsystem places a low power DC signal on the power cord of the power tool as an input signal. The controller within the power tool recognizes the presence of this DC signal and interprets it as a command to place the power tool in a communications mode. The controller then modulates the internal switching device of the power tool as needed to produce the current pulses which represent coded signals indicative of the stored contents of the control module. These current pulses are then decoded by the interface subsystem and the decoded information is transmitted to a suitable computing or data logging device.

The electronic module disposed in the power tool can be used to record and provide information to the external interface subsystem concerning the hours of use of the tool, serial number or user information related to the power tool, or any other valuable performance/operational data associated with the power tool. It is a principal advantage of the present invention that the power tool does not need to be disassembled to gain access to the control module to obtain the information stored within it. By applying an appropriate signal over the power cord of the power tool and using the controller associated with the power tool to modulate a switching component within the tool, signals can be sent over the tool's power cord that represent stored information from the tool's control module. Importantly, the input signal from the interface subsystem is recognized by the power tool's controller as a command that the tool be placed in a communicating mode. In the communications mode, the switching action of the switching component is such that the electric motor of the power tool cannot be energized to a sufficient extent to cause operation of the motor while data from the control module is being downloaded. An additional benefit is that the present invention does not require the use of a separate interface connector to be included on the housing.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
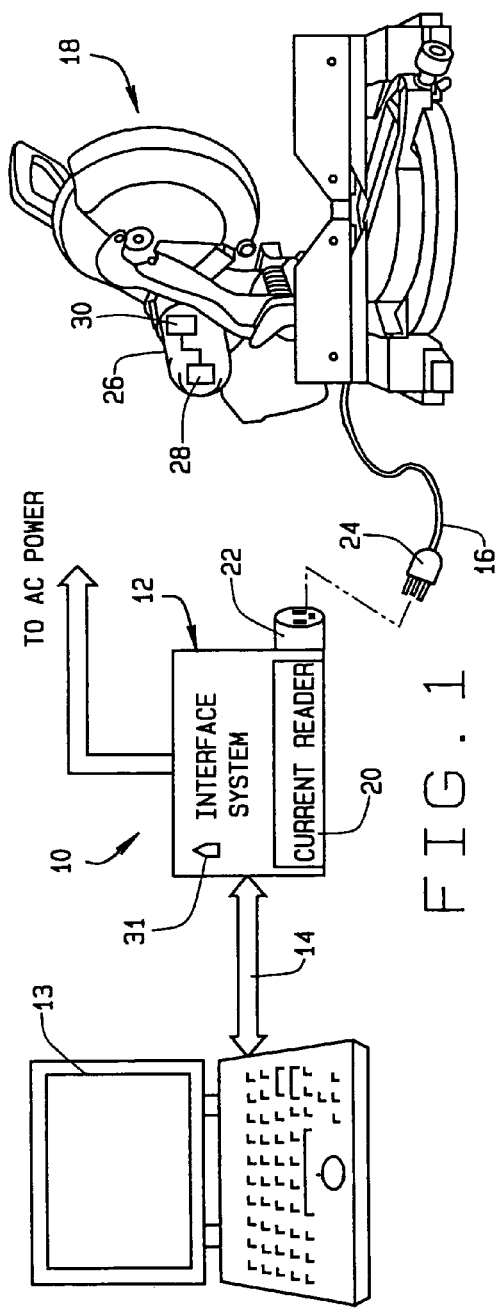
FIG. 1 is a simplified block diagram of the overall system of the present invention communicating with a laptop computer and a power cord of a power tool, and where the power tool is illustrated as a miter saw.
Figure 2:
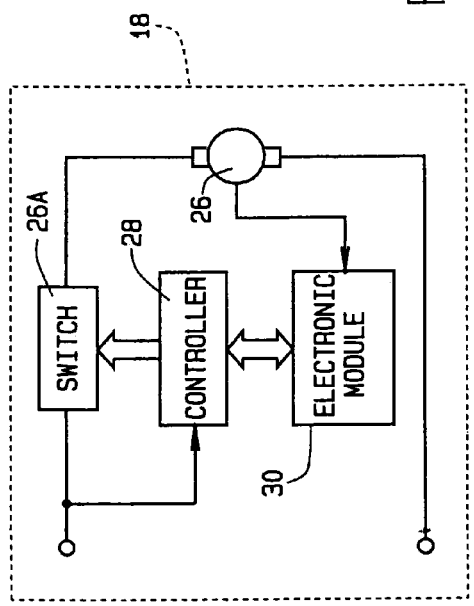
FIG. 2 is a simplified block diagram of the coupling of the electronic control module to the controller of the power tool and to the motor of the tool.

Referring to FIG. 1, there is shown a system 10 in accordance with a preferred embodiment of the present invention. The system 10 includes an interface subsystem 12 that is coupled to an AC power source. The interface system 12 is further coupled to a computing device 13 or other suitable data logging device via a suitable communications cable 14, and to a power cord 16 of an electrically driven power tool 18. The interface subsystem 12 includes a current reader circuit 20 that will be described in greater detail in the following paragraphs, and an electrical receptacle 22 for receiving a plug 24 of the power cord 16.

The power tool 18 includes a motor 26 which is controlled by a power switching device 26a in communication with a controller 28. The controller 28 is also in communication with an electronic module 30 housed within the housing of the tool 18. In actual practice, the controller 28 and the electronic module 30 could be provided by a single electronic component.

The electronic module 30 is used to store usage information or any other form of data pertaining to the operation, ownership or performance of the power tool 18. It will be appreciated that the power tool interface subsystem 12 and electronic module 30 essentially comprise the additional components that form the system 10. The motor 26, switching device 26a and the controller 28 are components that are typically included with many present day power tools.

It will also be appreciated that while the power tool 18 is illustrated as a miter saw, the present invention could be used with virtually any form of electrically driven power tool. Accordingly, drills, sanders, grinders, other forms of power saws, routers, joiners, etc. could be used with the present invention. The present invention could also be employed with outdoor products such as lawn mowers, blade and string trimmers, edgers, hedge trimmers, etc.

In general operation, the interface subsystem 12 is coupled to the computing device 13 and to the power tool 18 when it is desired to download the information stored in the electronic module 30. Interface subsystem 12 operates to apply a low power, high frequency input signal over the power line cord 16. The controller 28 recognizes this low power, high frequency signal as a command that the power tool 18 is to be placed in a communications mode to download the information stored in the electronic module 30. The voltage and/or frequency of the input signal applied to the power cord 16 is sufficiently different from a standard AC mains voltage such that the controller 28 immediately recognizes it as a command to enter the communications mode. The input signal is sufficiently low in magnitude that it does not cause the motor 26 of the power tool 18 to actually start rotating during the communication process with the interface subsystem 12. In one preferred form, the input signal comprises a 36 volt, 1 KHz AC signal.

The controller 28 of the power tool 18 is further synchronized to the high frequency AC input signal. When it detects the low power, high frequency input signal on the power cord 16, it begins pulsing on a power switching device 26a associated with the motor 26. The power switching device 26a is turned on during positive half cycles of the input signal to indicate a binary high (logic "1") level signal. The absence of a current pulse during any positive half cycle of the input signal signifies a logic "0" level signal.

The current pulses during the positive half cycles of the input signal are detected by the current reader circuit 20 and interpreted as a logic 1 level signal. Thus, if a current pulse is not detected during a given positive half cycle of the signal input to the power cord 16, the current reader circuit 20 interprets this absence of a current pulse as a logic 0 level signal. In this manner, the controller 28 can control the switching device 26a so that a binary stream of data is created over the power cord 16 which represents information stored in the electronic control module 30. This information is then transmitted to the computing device 12 and stored therein and/or displayed on a display thereof.

It will be appreciated that while the controller 28 may form an existing component of the power tool, it nevertheless requires suitable programming code to be able to recognize the command signal from the interface subsystem. Suitable programming code is also needed to control the switching device 26a in a manner needed to produce the current pulses on the power cord line 16.

It is a principal advantage of the present invention that the power tool 18 does not need to be disassembled to gain access to the stored information in the electronic control module 30. The power tool 18 need only be coupled to the interface subsystem 12, and the interface subsystem in turn coupled to the computing device 13, before the interface subsystem circuit can be used to download the information stored in the electronic control module 18. As will be appreciated, this significantly simplifies and expedites the downloading of the information stored in the electronic module 30. It also eliminates the possibility of accidental damage to other internal components of the power tool 18 or its housing which could occur if partial disassembly of the tool was required to obtain access to the internally mounted control module. It also significantly reduces the time needed to obtain usage/operational data, as compared to the time that would be required if manual disassembly of the power tool housing was required as part of the information gathering process.

Another important advantage of the present invention is that no interface connector(s) need to be integrated into the housing to permit the interface subsystem 12 to communicate with the controller 28. By using the power cord 16 to communicate with the controller 28, the need for a separate port or other form of electrical connector on the housing of the tool 18 is eliminated. This allows for greater flexibility in designing the housing so that maximum flexibility is afforded in positioning the controls of the tool 18. It also avoids the additional expense that would be incurred if a separate interface connector had to be integrated into the housing.

Figure 3:
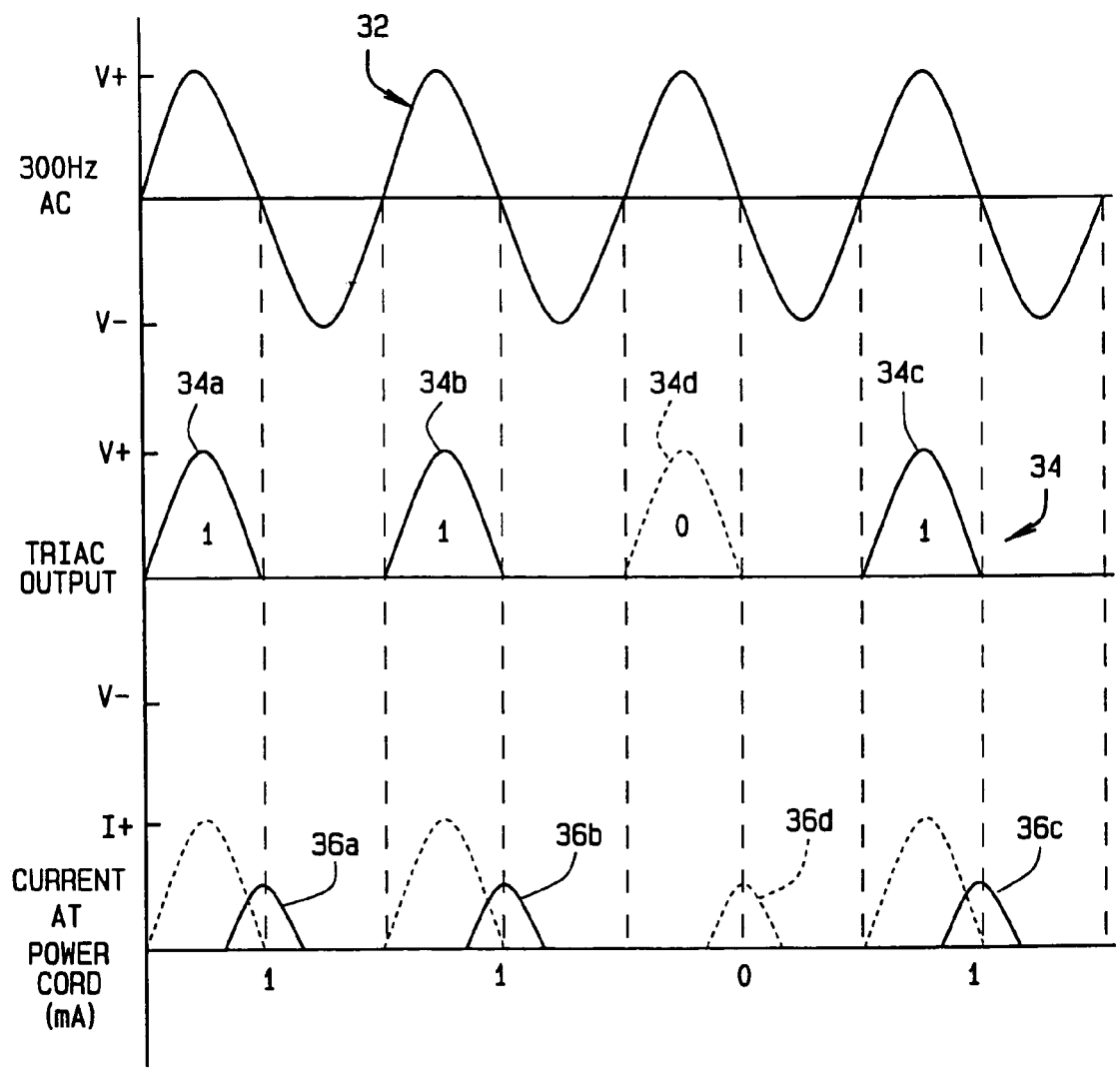
FIG. 3 is an illustration of the AC input signal waveform, the pulse train produced by the switching component within the tool, and the current pulses produced on the power cord of the tool during downloading of stored information from the electronic module located in the power tool.

Referring to FIG. 3, a typical AC input waveform 32 generated by the interface subsystem 12 is shown. The waveform is noted in FIG. 3 as an AC waveform which, will be appreciated, has a frequency well above the standard 60 Hz frequency of an AC mains signal used in the United States. Waveform 34 is comprised of switching signals 34a-34c generated by the switching device 26a within the tool 18 while the tool 18 is in the communications mode. Switching pulses 34a, 34b and 34c represent logic 1 level signals. The absence of a switching pulse, indicated by a dash line 34d, represents a logic 0 level signal. It will be noted that pulses 34a-34c are synchronized to the positive half cycles of input AC waveform 32. Waveform 36 illustrates the current pulses 36a, 36b and 36c that are produced by the switching pulse 34. Collectively, the three pulses 36a-36c and the absence of a pulse designated by dashed line 36d form a binary number of "1101". It will be noted that the current pulses 36a, 36b and 36c are shifted slightly in time relative to the switch signals 34a, 34b and 34c, respectively, due to the inductance of the motor 26.

It will also be appreciated that while positive pulses are illustrated in waveform 36, the present invention is not limited to the use of only positive-going, sinusoidal pulses. Other forms of pulses such as triangle or square wave pulses may be used, as well as a combination of positive-going and negative-going pulses.

Figure 4:
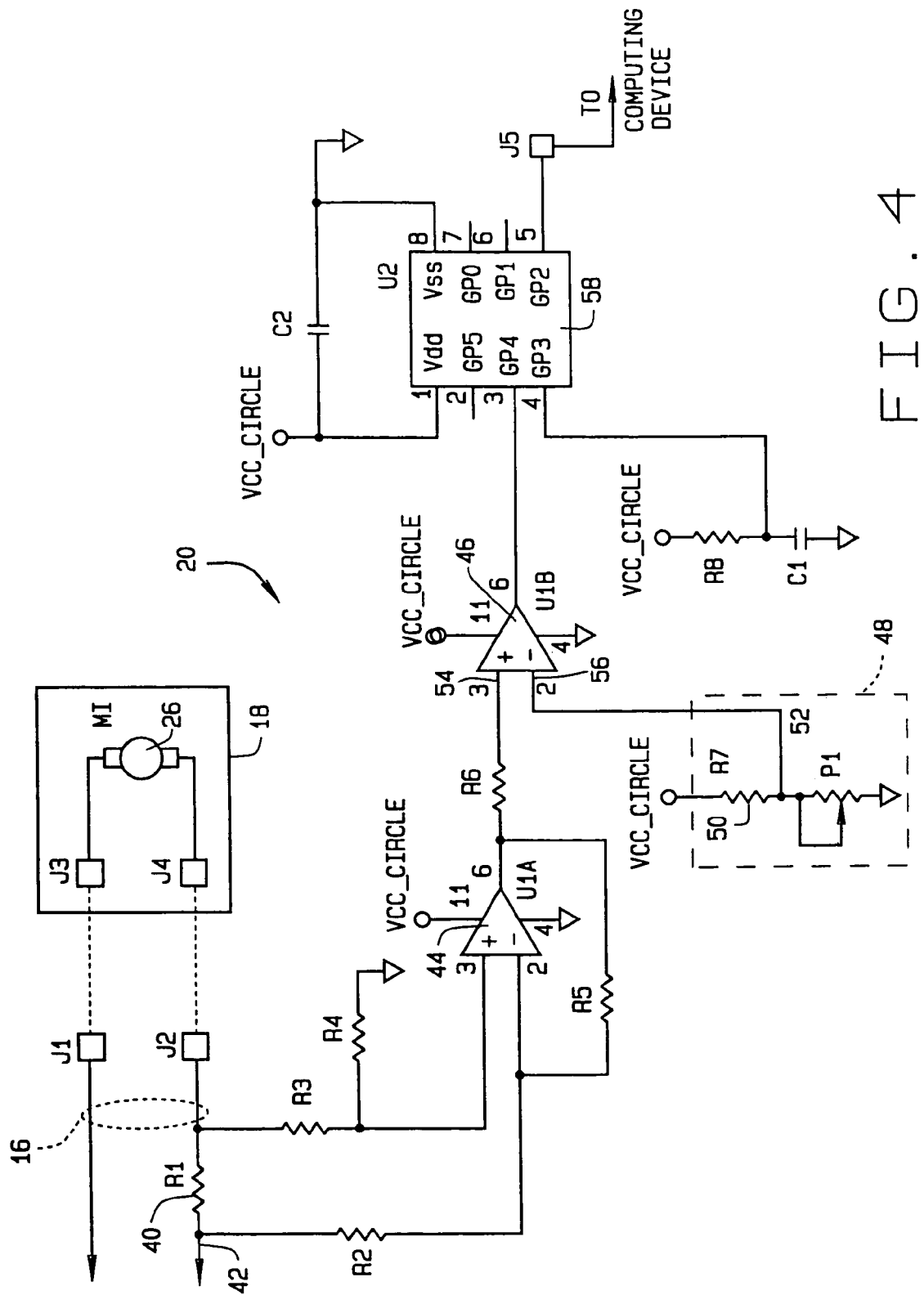
FIG. 4 is a simplified electrical schematic diagram of the current reader of the interface subsystem.

Referring now to FIG. 4, a preferred form of the current reader circuit 20 is illustrated. It will be appreciated immediately that the values for the electrical components shown in FIG. 4 are merely shown for exemplary purposes.

As explained previously, the current reader circuit 20 contains the necessary circuitry for detecting whether a current pulse exists during any half cycle of the input sine wave 32 of FIG. 3. It accomplishes this by the use of a small current shunt resistor 40 placed in series with the low side (neutral) power line 42 which couples to the power cord 16 of the power tool 18 through receptacle 22. A differential gain op-amp 44 monitors the voltage across the shunt resister 40. The op-amp 44 amplifies the voltage to a level that the remainder of the current reader circuit 20 can use. The output of the op-amp 44 is then passed to a comparator 46 that checks to see if the voltage is above a preset threshold set by a voltage divider network 48. The voltage divider network 48 is comprised of a resistor 50 and a potentiometer 52.

When the voltage at input 54 of the comparator 46 is higher than the threshold voltage on input 56, the comparator 46 sends signals to a microcontroller 58 that there is a current present at that time. The microcontroller 58 is therefore apprised of the current pulse that is present at that given instant and is also synchronized with the input sine wave 32. The microcontroller 58 checks if the comparator 46 is indicating that current is present during a positive half wave of the input sine wave 32. It is also able to determine the length of time that the current pulse is present, if necessary. From this, the microcontroller 58 records the pulses as they occur in an internal memory. When communication is finished (i.e., once 8-bits have been received), the microcontroller 58 transmits the 8-bit data at a standard baud rate and in serial fashion, to the data logging device 13. It will be appreciated that the current reader circuit 30 can read and synchronize with virtually any frequency signal. Also, it will be appreciated that the values for the electrical components shown in FIG. 4 are exemplary only.

It will also be appreciated that while the system 10 has been described in connection with the use of an alternating current signal, that a low power DC signal could also be employed instead of the AC signal. The controller 28 can be programmed to recognize this "weak" DC current as an indication that the power tool 18 is to be placed in a communications mode. The controller 28 can then pulse the power switching device 26a of the power tool 18 to produce the coded pulse train representative of the stored information in the electronic module 30. Due to the weak DC signal, the power switching device 26a, which may comprise a thyristor or any other suitable switch, never latches. The switching device 28a can be easily and very quickly switched, thus allowing a high throughput.

Figure 5:
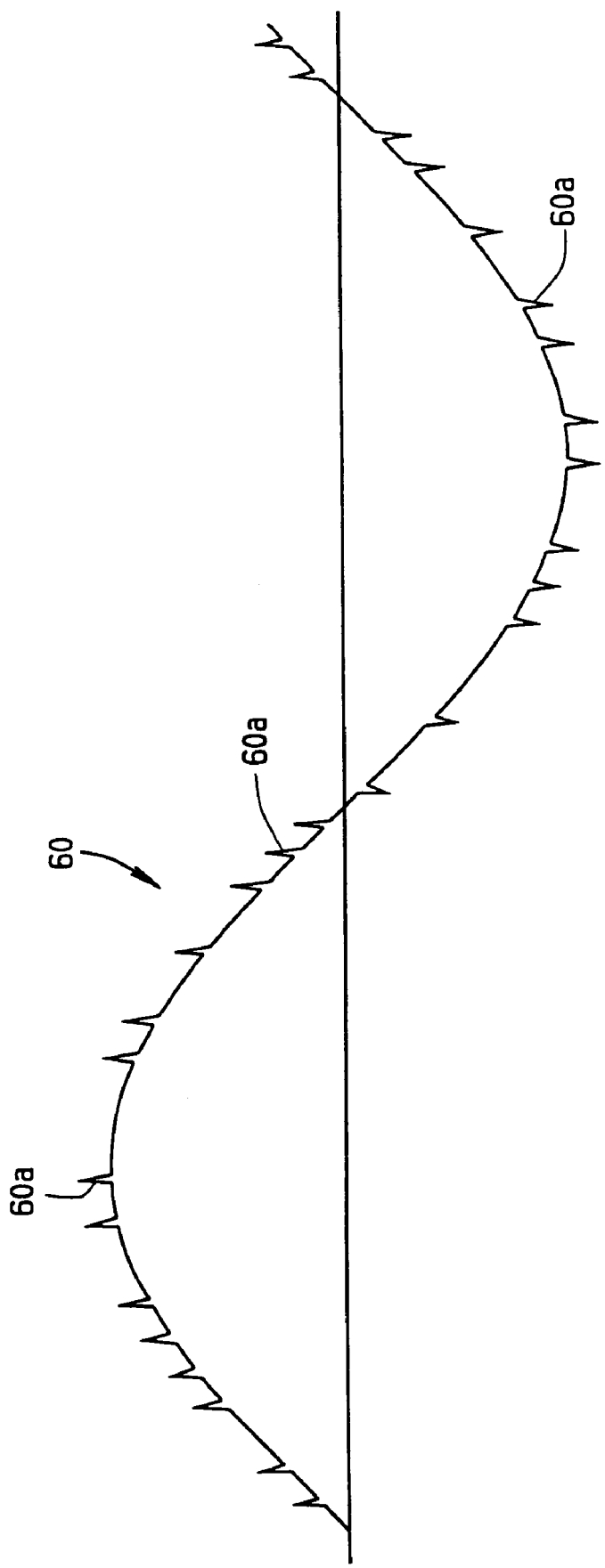
FIG. 5 is a sample waveform illustrating how current pulses could be capacitively coupled onto an input waveform to transmit data stored in the electronic control module of the power tool to the interface subsystem.

Still another method for transmitting information over the power line cord 16 could be formed by the use of capacitive coupling to the AC signal applied to the power cord 16. With reference to FIG. 5, this method causes small pulses 60a to be superimposed on the AC signal 60 being input to the power cord 16. The interface subsystem 12 monitors the pulses 60a and extracts the data as needed before transmitting the data to the data logging device 13.

It should be emphasized that each of the preferred methods for transmitting information from the electronic module 30 over the power cord 16 to the system 10 involve the application of an input signal which is of sufficiently low power (or of a predetermined frequency) that the controller 28 will not pulse the switching device 26a in a manner sufficient to cause the motor 26 to actually start to turn. Thus, the information from the electronic module 30 can be downloaded through the power cord 16 without fear of the tool 18 turning on during this process.

The present invention thus forms a convenient means for obtaining information stored in an electronic module disposed within a power tool and in a manner which does not require any disassembly of the power tool. In this manner, a variety of useful information/data concerning the performance, characteristics, identification or other data of the tool can be quickly accessed and recorded on a computer or other data logging device.

What is claimed is:

1. A power tool comprising an alternating current (AC) power cord for coupling to an AC power source;
    a controller housed within said power tool operable to recognize an input signal received over said AC power cord that is different from an AC power signal from said AC power source, and to enter a communications mode in response to receiving said input signal;
    a memory component housed within said tool and in communication with said controller, for storing operational information relating to said power tool; and
    said controller operating to obtain stored operational information from said memory upon receipt of said input signal, and to transmit signals back over said AC power cord representative of said stored operational information.

2. The power tool of claim 1, wherein said input signal comprises an AC input signal, said controller entering a communications mode upon receipt of said AC input signal.

3. The power tool of claim 2, wherein said controller generates current pulses that are transmitted over said AC power cord, in response to receiving said AC input signal, and wherein said current pulses represent said stored operational information.

4. The power tool of claim 1, wherein said signals transmitted over said AC power cord are synchronized with said input signal.

5. The power tool of claim 1, wherein said signals transmitted over said AC power cord comprise periodic pulses.

6. A system for communicating information between a power tool and an independent subsystem using an alternating current (AC) power cord of the tool as a signal conducting medium, the system comprising:
- an independent interface subsystem adapted to be coupled to a plug of said AC power cord;
- a controller housed within said tool operable to recognize an input signal transmitted over said AC power cord from said independent interface subsystem and to enter a communications mode in response to said input signal;
- a memory component housed within said tool and in communication with said controller, for storing operational information relating to said power tool; and
- said controller operating to obtain stored operational information from said memory upon detection of said input signal, and to transmit signals over said AC power cord to said independent interface subsystem that correspond to said stored operational information.

7. The system of claim 6, wherein said signals transmitted over said AC power cord to said independent interface subsystem are synchronized with said input signal.

8. The system of claim 6, wherein said signals sent over said AC power cord to said independent interface subsystem comprise periodic pulses.

9. The system of claim 8, wherein said periodic pulses comprise current pulses.

10. The system of claim 6, wherein said input signal comprises an AC input signal having a frequency above about 60 Hz.

11. The system of claim 10, wherein said AC input signal comprises a frequency of about 300 Hz.

12. A system for communicating stored performance related information for an electrically powered device, in which the electrically powered device has a motor that is activated by an electronic switching element housed with said device, the system comprising:
- a controller housed within said device;
- a memory housed within said device and in communication with said controller, the memory operating to store operational information for said device;
- an interface subsystem adapted to be coupled to a plug of an alternating current (AC) power cord of said device and to cause stored operational information in said memory to be transmitted, as electrical signals formed by actuating said switching element, that correspond to said stored operational information, over said AC power cord back to said interface subsystem.

13. The system of claim 12, wherein said interface subsystem further operates to decode said electrical signals received via said AC power cord.

14. The system of claim 12, wherein said interface subsystem further operates to send an input signal over said AC power cord to inform said controller that said stored operational information is to be transmitted back to said interface subsystem.

15. The system of claim 14, wherein said input signal comprises an AC signal having a frequency greater than about 60 Hz.

16. The system of claim 15, wherein said AC input signal has a frequency of about 300 Hz.

17. The system of claim 12, wherein said electrical signals comprise electrical pulses.

18. The system of claim 17, wherein said electrical pulses comprise current pulses.

19. The system of claim 15, wherein said electrical signals are capacitively coupled onto said AC input signal being supplied over said AC power cord to said device.

20. The system of claim 12, wherein said device comprises a power tool.

21. The system of claim 12, wherein said device comprises a hand held power tool.

22. A method for communicating operational information for an alternating current (AC) powered device, from the device to an independent subsystem via an AC power cord of the device, the method comprising:
- storing operational information concerning the device in a memory component housed within the device;
- using said AC power cord of the device to transmit an electrical input signal to a controller housed within the device that stored operational information in said memory is to be transmitted from said device; and
- using the controller to access the memory and to transmit the stored operational information, as representative electrical signals, back over the AC power cord.

23. The method of claim 22, further comprising coupling an independent interface device to a plug of said AC power cord to generate said electrical input signal over said AC power cord.

24. The method of claim 22, further comprising synchronizing the transmission of said representative electrical signals with a frequency of said electrical input signal.

25. The method of claim 22, further comprising using said independent interface device to decode said representative electrical signals.

26. An interface system for communicating with an AC powered device, wherein the device has a memory for storing information relating to the device, and an AC power cord for receiving an AC power signal to power the device, the interface system comprising:
- a receptacle for electrically coupling with a plug of said AC power cord;
- a circuit for generating an electrical input signal transmitted over said AC power cord to said device, said electrical input signal being different from said AC power signal operable to place said device in a communications mode so that information stored in said memory of said device can be transmitted from said device over said AC power cord; and
- said circuit further operating to decode signals representative of operational information pertaining to said device, received over said AC power cord from said device.

27. The interface system of claim 26, wherein said electrical input signal comprises an AC signal having a frequency greater than about 60 hertz.

28. The interface system of claim 27, wherein said circuit comprises a circuit operable to decode current pulses coupled onto said AC signal, transmitted from said device to said circuit over said AC power cord.

29. A method of obtaining stored information relating to operational performance of an AC powered power tool, comprising:
- storing operational performance information relating to operation of said AC powered power tool in a memory housed within a housing of said power tool;
- using a controller housed within said housing of said power tool to monitor for a communications signal received over an AC power cord of said power tool, where said communications signal is different from an AC power signal used to power said power tool during normal operation of said power tool;

when said signal is detected by said controller, causing said controller to obtain said stored information from said memory;

using said controller to generate electrical signal pulses representative of said stored information by modulating a switch of said power tool that is used to turn on and off a motor of said power tool; and transmitting said electrical signal pulses over said AC power cord to an external device.

* * * * *

UNITED STATES PATENT AND TRADEMARK OFFICE
CERTIFICATE OF CORRECTION

PATENT NO. : 7,346,406 B2  Page 1 of 1
APPLICATION NO. : 11/350359
DATED : March 18, 2008
INVENTOR(S) : Daniele C. Brotto et al.

It is certified that error appears in the above-identified patent and that said Letters Patent is hereby corrected as shown below:

<u>Title Page</u>,
Item (45) Date of Patent, "Mar. 18, 2008" should be --*Mar. 18, 2008--.

<u>Title Page</u>,
Item (*) Notice, insert --This patent is subject to a terminal disclaimer.--.

Signed and Sealed this

Seventeenth Day of November, 2009

David J. Kappos
*Director of the United States Patent and Trademark Office*